April 24, 1951 R. COLOMBO 2,550,226
EXTRUSION PRESS
Filed Feb. 19, 1948 2 Sheets-Sheet 1

INVENTOR
ROBERTO COLOMBO
By: Haseltine, Lake & Co
AGENTS

April 24, 1951  R. COLOMBO  2,550,226

EXTRUSION PRESS

Filed Feb. 19, 1948  2 Sheets-Sheet 2

INVENTOR
Roberto Colombo
By:
Haseltine, Lake & Co.
AGENTS

Patented Apr. 24, 1951 2,550,226

UNITED STATES PATENT OFFICE 2,550,226

EXTRUSION PRESS

Roberto Colombo, Turin, Italy

Application February 19, 1948, Serial No. 9,588
In Italy April 30, 1943

2 Claims. (Cl. 18—12)

This invention relates to an extrusion press for handling material in a molten or soft state, more particularly for extruding thermoplasts.

In extruding the abovementioned materials it is nearly always necessary for the propelling force to be such as to compress the material, even if gradually, before passing through the extrusion opening or openings.

Said propelling force is therefore proportional to the shape of the extruded material.

However, nearly all thermoplasts are highly viscous at their melting temperature, so that a considerable propelling force is required. This is generally obtained by means of screws or conveyor screws.

An object of this invention is to provide a screw press of the above-mentioned type comprising at least three screws having screw threads wound in the same direction and in which the threads of a screw mesh with the threads of all adjacent screws. Obviously, under these conditions, all the screws are rotated in operation in the same direction. By this particular arrangement the material is fed through the casing enclosing the screws, from the filling hopper towards the extrusion opening by reason of the fact that one of the threads is pushed into the other by the side of the latter and is at the same time removed from both by the side of the third screw thread.

This invention affords chiefly the following advantages:

(a) thorough mixing of the raw stuffs employed, whereby the various ingredients of the plastic substances are homogenised at the highest degree;

(b) considerable propelling force which is apt to overcome any stress produced by the material through the extrusion nozzle or nozzles;

(c) uniformity of the material on issue from the nozzle as distinct from issue by steps as often occurs in construction known heretofore;

(d) highest output per hour though utilising limited and simple means.

The accompanying drawing shows diagrammatically by way of example some constructions of the device according to this invention.

Figure 1:
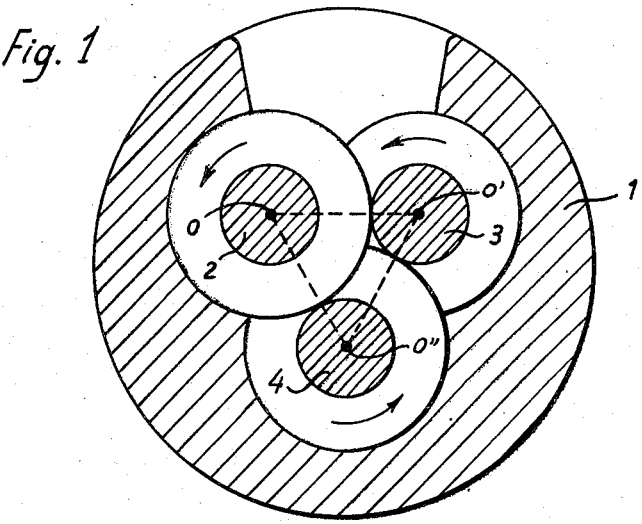
Figure 1 is a cross sectional view of an extrusion press with three intermeshing screws.
Figure 2:
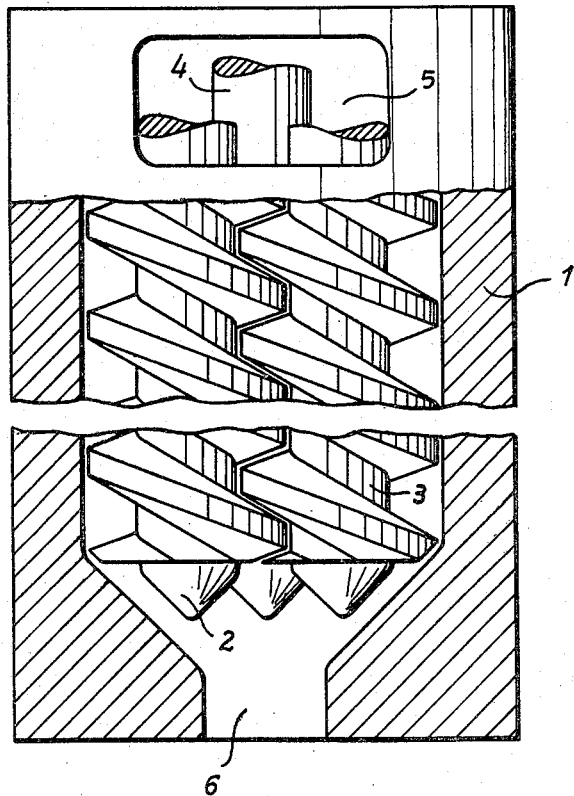
Figure 2 is a plan view.

Referring to Figures 1 and 2, 1 denotes the casing of the apparatus, having mounted therein the three screws 2—3—4 of which the axes 0—0'—0'' are situated on an equilateral triangle as shown in Fig. 1. The screws 2, 3, and 4 have their threads wound in the same direction, all mesh with one another, whereby they are rotated in operation in the same direction. The material admitted through the filling opening 5 (Fig. 2) of the casing is carried along by the screws which gradually feed the material by their intermeshing threads till the outlet end 6 acting as die opening. The material issuing from this opening is thoroughly mixed and highly compressed.

Figure 3:
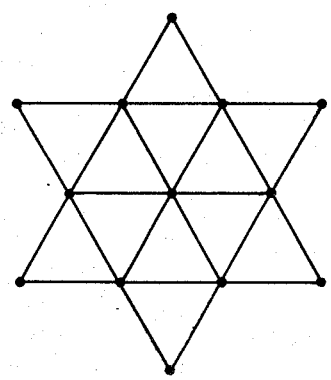
Figure 3 is a diagram showing the screw arrangement by coupling equilateral triangles of which the apexes represent the screw axes.
Figure 4:
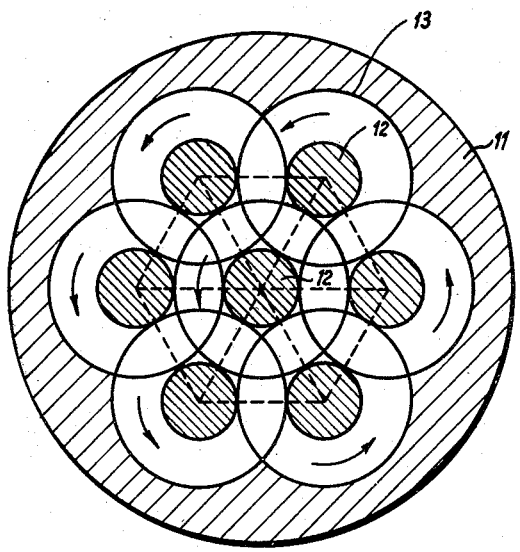
Figure 4 is a cross section view of a press including seven screws.

A press according to this invention may be obtained by any number of screws, always arranged with their axes according to equilateral triangles, so that by the coupling of two or more triangles, of which the apex represents the screw axes, each triangle has either an apex or its base in common with an adjacent triangle, as shown by the diagram, Fig. 3, and the cross sectional view of a seven screw construction, Fig. 4. In this figure, 11 denotes the casing, having mounted therein a circular row of six screws 12 seated in as many semicylindrical recesses 13 in the casing, and a central screw 12' identical with the screws 12, that is, having a screw thread similar to those of screws 12. The central screw 12' meshes with all the peripheral screws 12 and each of the latter meshes with the adjacent peripheral screws. All the screws 12 and 12' are of course rotated in the same direction.

Figure 5:
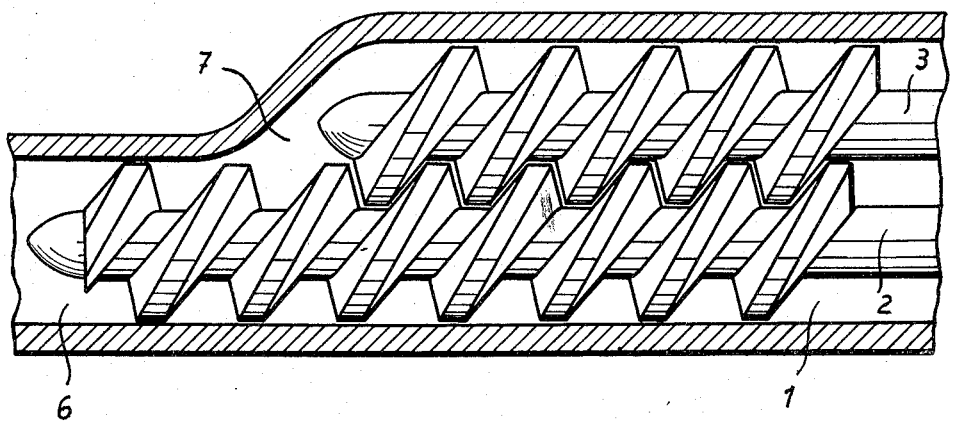
Figure 5 is a detailed view of the press shown in Figures 1 and 2 improved on the extrusion nozzle side by shortening part of the screws, some of which only reach the extrusion opening, in order to further improve mixing of the material.

According to Figure 5 the improved device further comprises means for obtaining a more thorough mixing of the material. In this construction, part only of the screws extend to the die opening 6, while the remaining screws are shorter and leave free in the casing toward said opening a chamber 7 in which the material fed by the shorter screws accumulates. The volume of material fed to the chamber 7, which must necessarily discharge to the outside, as fresh material is constantly conveyed by the shorter screws to said chamber, is compelled to move along the thread of the screw or screws extending down to the nozzle 6, as these screws obviously are not capable to propel by their thrust the whole mass of material fed by all the screws of the press.

This sliding motion produces a thorough mixing which further improves the mixture resulting from the direct action of the screws with intermeshing threads.

I wish it to be understood that I do not desire to be limited to the exact details of construction shown and described, for obvious modifications will occur to a person skilled in the art.

What I claim is:

1. In an extrusion press for materials in a molten or plastic state having at least three intermeshing screws rotating in the same direction, the threads of each screw completely filling the space between the threads of the intermeshing screws, the improvement that the center lines of the intermeshing screws are arranged along the edges of equilateral prisms so that each screw intermeshes with at least two adjacent screws, the axis of one screw being symmetrically located with respect to the axes of all the other screws.

2. In an extrusion press for materials in a molten or plastic state having at least three intermeshing screws rotating in the same direction, the threads of each screw completely filling the space between the threads of the intermeshing screws, the improvement that the center lines of the intermeshing screws are arranged along the edges of equilateral prisms so that each screw intermeshes with at least two adjacent screws, the axes of all but one screw being arranged symmetrically with respect to the axis of said one screw, said one screw being longer than all the other screws.

ROBERTO COLOMBO.

REFERENCES CITED

The following references are of record in the file of this patent:

UNITED STATES PATENTS

| Number | Name | Date |
|---|---|---|
| 1,990,555 | Loomis | Feb. 12, 1935 |
| 2,048,286 | Pease | July 21, 1936 |
| 2,293,297 | Kiesskalt et al. | Aug. 18, 1942 |
| 2,441,222 | Fuller | May 11, 1948 |

FOREIGN PATENTS

| Number | Country | Date |
|---|---|---|
| 35,106 | Austria | June 1, 1908 |
| 163,440 | Germany | Oct. 12, 1905 |
| 240,500 | Switzerland | Apr. 16, 1946 |
| 373,183 | Italy | July 21, 1939 |